United States Patent
Chakradhar

(10) Patent No.: US 11,922,825 B2
(45) Date of Patent: Mar. 5, 2024

(54) SYSTEM AND METHOD FOR PRIVACY-PRESERVING ONLINE PROCTORING

(71) Applicant: Anjali Chakradhar, Manalapan, NJ (US)

(72) Inventor: Anjali Chakradhar, Manalapan, NJ (US)

( * ) Notice: Subject to any disclaimer, the term of this patent is extended or adjusted under 35 U.S.C. 154(b) by 37 days.

(21) Appl. No.: 17/459,664

(22) Filed: Aug. 27, 2021

(65) Prior Publication Data

US 2023/0067473 A1    Mar. 2, 2023

(51) Int. Cl.
*G09B 7/00*     (2006.01)
*G06F 16/28*    (2019.01)
(Continued)

(52) U.S. Cl.
CPC ............. *G09B 7/00* (2013.01); *G06F 16/285* (2019.01); *G06F 21/6254* (2013.01);
(Continued)

(58) Field of Classification Search
CPC ........ G09B 7/00; G06F 16/285; G06V 20/49; H04N 5/76
See application file for complete search history.

(56) References Cited

U.S. PATENT DOCUMENTS 8,926,335 B2 *   1/2015   Kumar .................... H04N 7/18
                                                    434/350
9,142,136 B2     9/2015   Rogers et al.
(Continued)

OTHER PUBLICATIONS

Rebecca Heilweil; Paranoia about cheating is making online education terrible for everyone; Vox Recode; https://www.vox.com/recode/2020/5/4/21241062/schools-cheating-proctorio-intelligence; pp. 1-8; Dated May 4, 2020.

(Continued)

*Primary Examiner* — Xuan M Thai
*Assistant Examiner* — Sadaruz Zaman
(74) *Attorney, Agent, or Firm* — Sughrue Mion, PLLC

(57) ABSTRACT

A method and system for online proctoring of tests while preserving privacy of test-taker is disclosed. Proctoring data, which include video and audio data from at least one camera and a microphone monitoring the test-taker and the test environment, is chopped up into data fragments. Each fragment is altered to replace personally identifiable information, and the altered fragment is encrypted using a cryptographic key. The chronological order of fragments is also scrambled. Encrypted and altered data fragments are distributed to a pool of proctors who review the encrypted fragment for suspicious behavior. Suspicious fragments are further compared with original, unaltered versions of the fragments to confirm suspicious behavior, and render a verdict. The test-taker is aware of, and explicitly consents to the processing of a fragment by a proctor. A secure, custom viewer for the fragments also allows the test-taker to control the number of times a proctoring data segment can be viewed. Our method and system ensure the privacy of the proctoring data by explicitly authorizing every entity that processes a proctoring data fragment, and limiting number of views of the fragment, while allowing independent evaluation of proctoring data for different forms of cheating.

19 Claims, 5 Drawing Sheets

Privacy-preserving online proctoring system

(51) Int. Cl.
*G06F 21/62* (2013.01)
*G06F 21/84* (2013.01)
*G06V 20/40* (2022.01)
*H04N 5/76* (2006.01)

(52) U.S. Cl.
CPC .............. *G06F 21/84* (2013.01); *G06V 20/49* (2022.01); *H04N 5/76* (2013.01)

(56) References Cited

U.S. PATENT DOCUMENTS

| | | | |
|---|---|---|---|
| 9,154,748 B2 | 10/2015 | Hsu et al. | |
| 9,601,024 B2* | 3/2017 | Morgan | G09B 5/125 |
| 9,875,345 B2 | 1/2018 | Sadeh | |
| 9,892,650 B2* | 2/2018 | Rogers | G09B 7/02 |
| 9,953,543 B2* | 4/2018 | Shah | G09B 7/00 |
| 9,984,582 B2 | 5/2018 | Logan et al. | |
| 10,083,619 B2* | 9/2018 | Morgan | G09B 7/00 |
| 10,127,826 B2 | 11/2018 | Rogers et al. | |
| 10,540,907 B2* | 1/2020 | Breed | G02B 27/017 |
| 11,205,349 B2* | 12/2021 | Jaeh | G09B 7/00 |
| 2002/0172931 A1* | 11/2002 | Greene | G09B 7/00 434/322 |
| 2004/0229199 A1* | 11/2004 | Ashley | G09B 7/00 434/323 |
| 2008/0108039 A1* | 5/2008 | Rogers | G09B 7/02 434/350 |
| 2012/0264100 A1* | 10/2012 | Rogers | G09B 7/06 434/350 |
| 2013/0344470 A1* | 12/2013 | Morgan | G09B 7/00 434/350 |
| 2016/0098939 A1* | 4/2016 | Rogers | G09B 5/00 434/322 |
| 2016/0182542 A1* | 6/2016 | Staniford | H04L 63/1458 726/23 |
| 2018/0131518 A1* | 5/2018 | Scicchitano | G06F 21/32 |
| 2019/0156689 A1* | 5/2019 | Jaeh | G09B 7/00 |
| 2019/0206101 A1 | 7/2019 | De La Torre et al. | |
| 2021/0295725 A1* | 9/2021 | Jaeh | G09B 7/00 |
| 2022/0392360 A1* | 12/2022 | Jaeh | G09B 5/00 |
| 2023/0067473 A1* | 3/2023 | Chakradhar | G06V 20/49 |
| 2023/0154345 A1* | 5/2023 | Jaeh | G09B 5/00 434/350 |

OTHER PUBLICATIONS

Department of Homeland Security; What is personally identifiable information ?; https://www.dhs.gov/privacy-training/what-personally identifiable information; pp. 1-2; Dated Mar. 29, 2021.
J. Kelly and L. Oliver; Electronic Frontier Foundation; Proctoring Apps Subject Students to Unnecessary Surveillance; https://www.eff.org/deeplinks/2020/08/proctoring-apps-subject-students-unnecessary-surveillance; pp. 1-7; Dated Aug. 20, 2020.
Lawrence Abrams; ProctorU confirms data breach after database leaked online; Bleeping Computer; https://www.bleepingcomputer.com/news/security/proctoru-confirms-data-breach-after-database-leaked-online/: pp. 1-14; Dated Aug. 9, 2020.
ProctorU Inc.; Online exam integrity secured by real people; https://www.proctoru.com/; pp. 1-6.
Examity Inc.; Online proctoring on your terms; https://www.examity.com; pp. 1-4; Dated 2021.
Jason Kelley; Electronic Frontier Foundation; A Long Overdue Reckoning for Online Proctoring Companies May Finally Be Here; https://www.eff.org/deeplinks/2021/06/long-overdue-reckoning-online-proctoring-companies-may-finally-be-here; pp. 1-111 Dated Jun. 22, 2021.
Honorlock Inc.; Online exam proctoring with a human touch; https://honortock.com; pp. 1-11. 2021.
The Insight Partners; Intrado GlobeNewswire; Online Exam Proctoring Market to Reach US$ 1,187.57 million by 2027; https:/www.globenewswire.com/news-release/2021/02/23/2180512/0/en/Online-Exam-Proctoring-Market-to-Reach-US-1-187-57-million-by-2027-COVID-19-Impact-and-Global-Analysis-by-The-Insight-Partners.html; pp. 1-5; dated Feb. 23, 2021.
S. Morrison and R. Heilweil; How teachers are sacrificing student privacy to stop cheating; https://www.vox.com/recode/22175021/school-cheating-student-privacy-remote-learning; pp. 1-9; dated Dec. 18, 2020.
D. Bitouk et al.; Face swapping: automatically replacing faces in photographs; https://www1.cs.columbia.edu/CAVE/publications/pdfs/Bitouk SIGGRAPH08.pdf 8 pages.
W. Yaqub, M. Mohanty and B. Suleiman; Image hashing based anomaly detection for privacy preserving on-line proctoring; arXiv:2107.09373v1 [cs.CR]; https://arxiv.org/pdf/2107.09373.pdf: 7 pages; Dated Jul. 20, 2021.

* cited by examiner

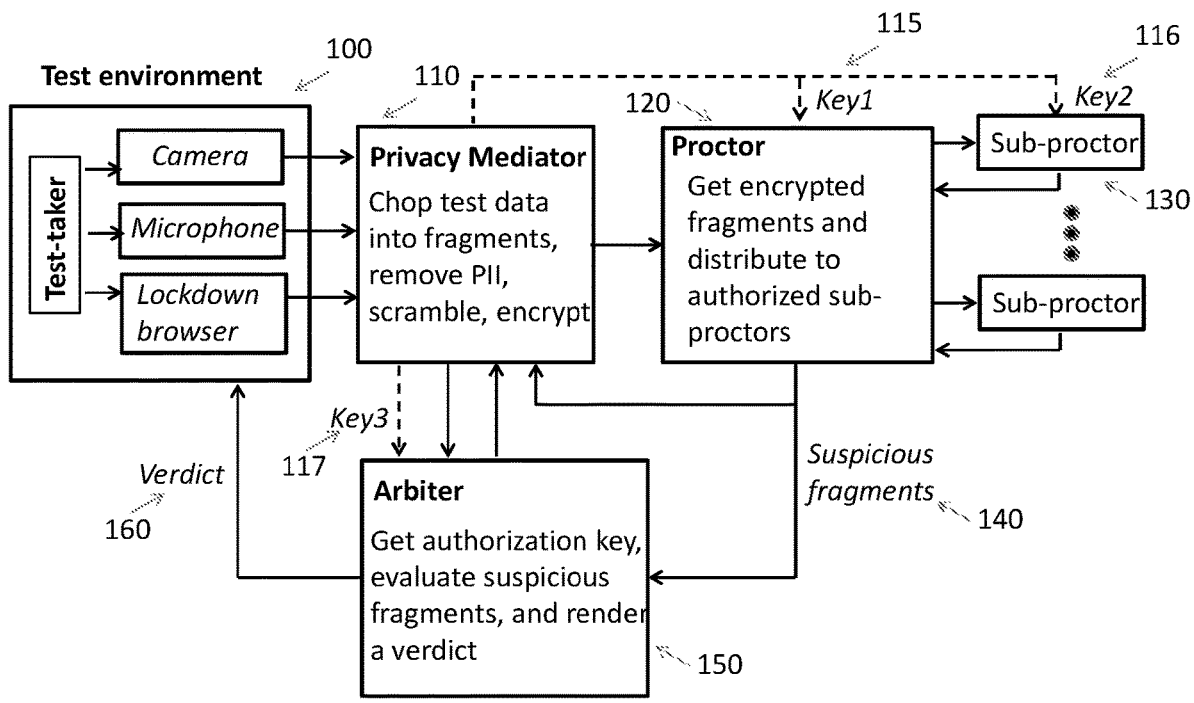
Figure 1: Privacy-preserving online proctoring system

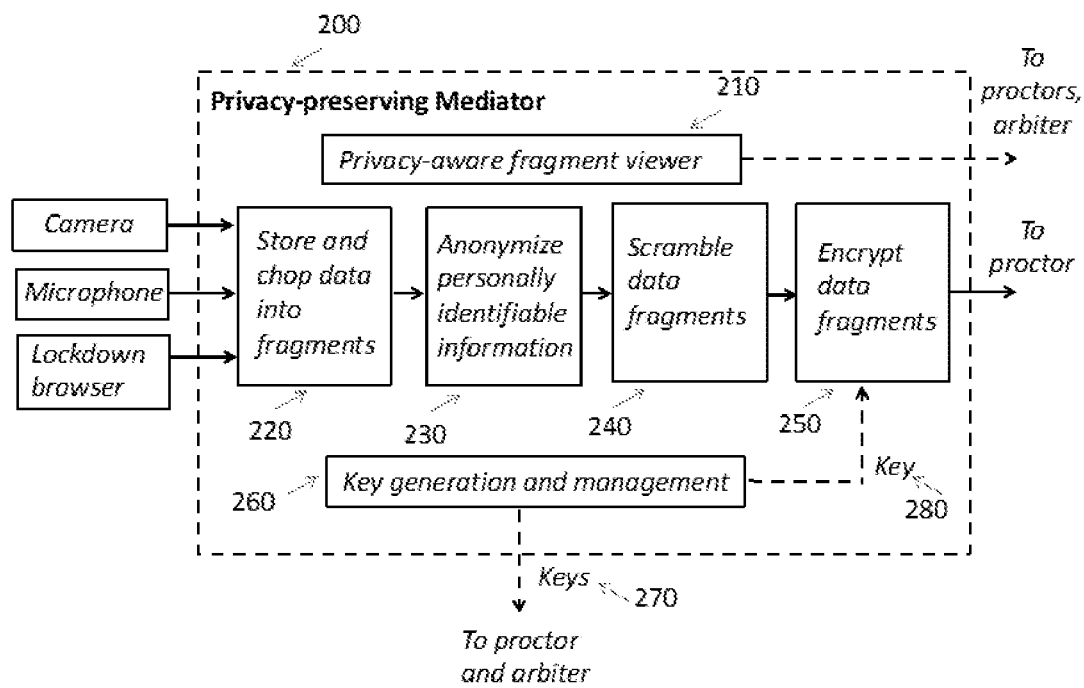
Figure 2: Privacy-preserving mediator

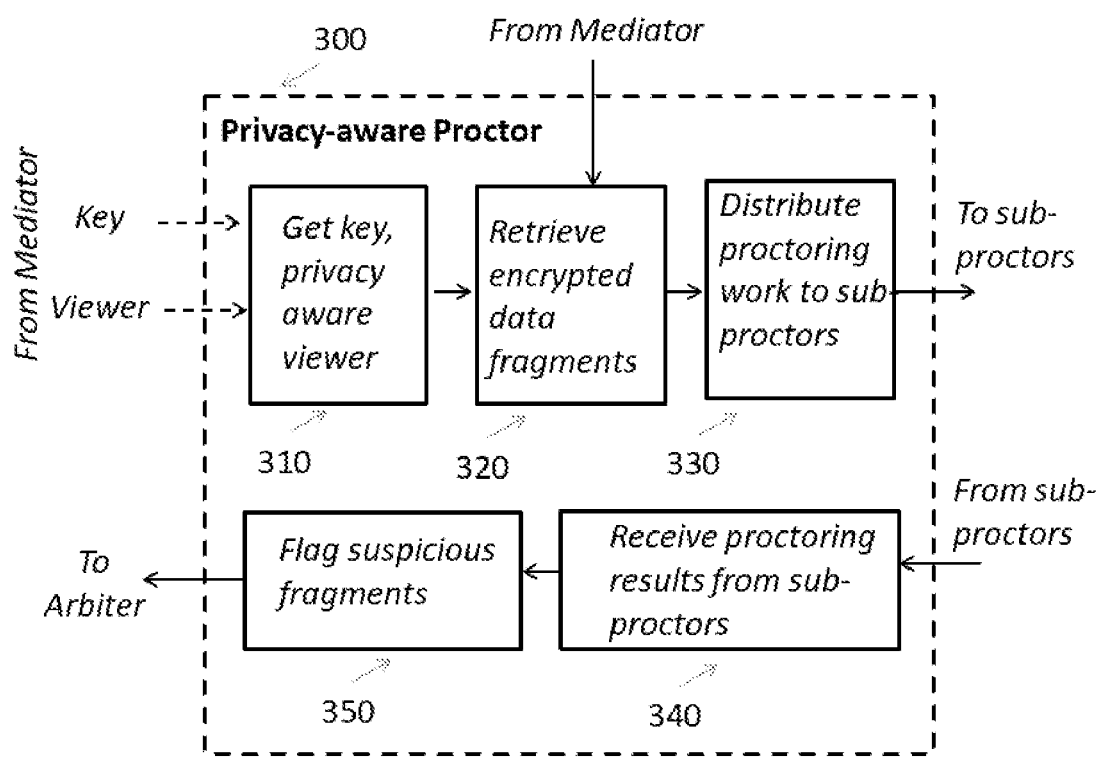
Figure 3: Privacy-aware proctor

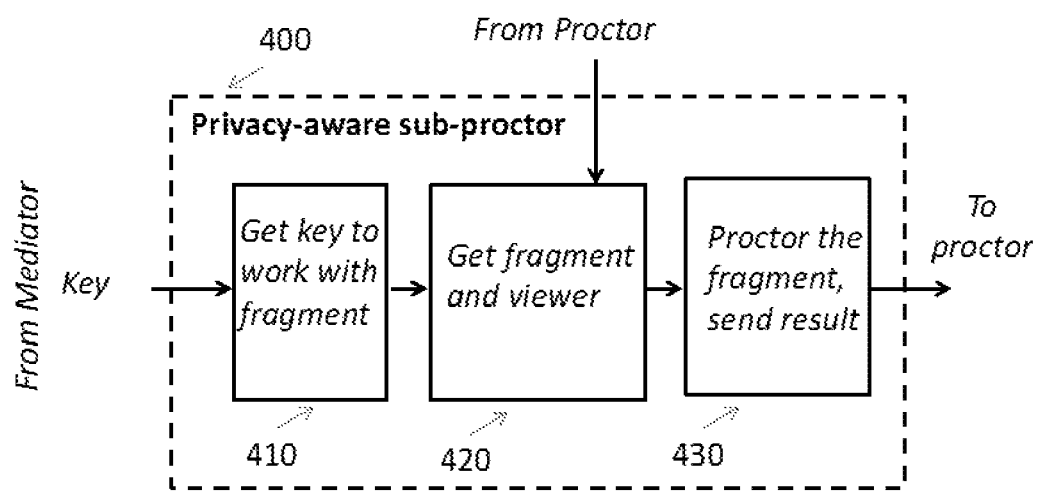
Figure 4: Privacy-aware sub-proctor

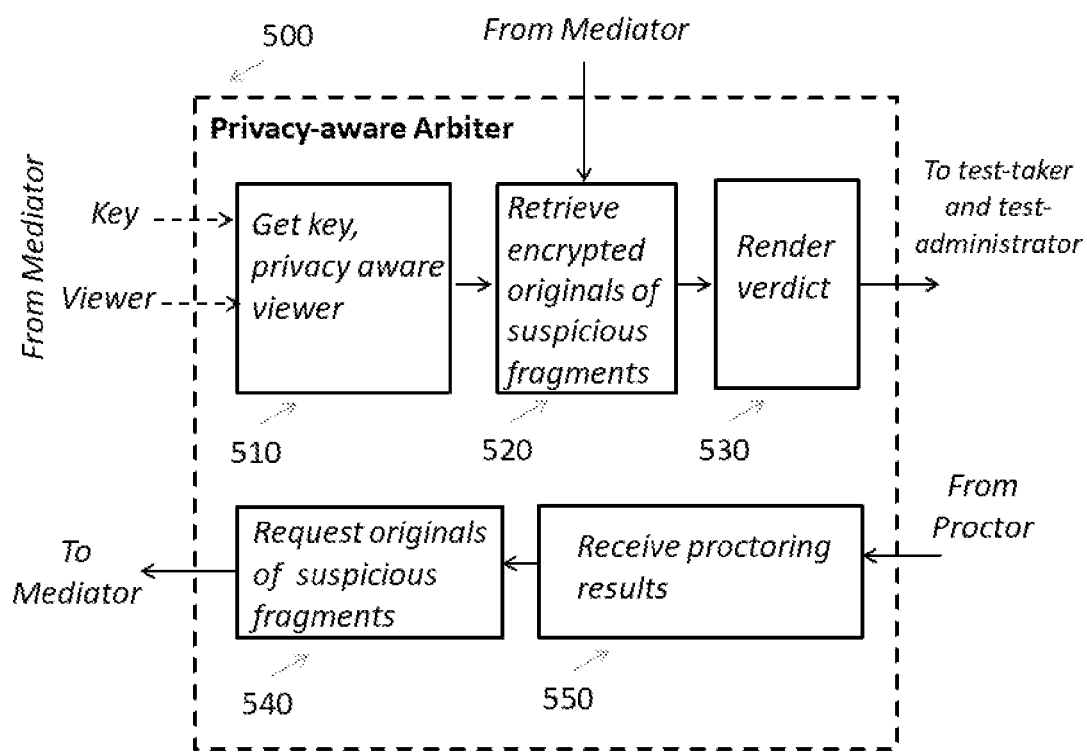
Figure 5: Privacy-aware Arbiter

SYSTEM AND METHOD FOR PRIVACY-PRESERVING ONLINE PROCTORING

BACKGROUND OF THE INVENTION

This invention relates to a method of online proctoring that makes it hard for students to cheat on online tests while preserving the privacy of the test-taker.

DESCRIPTION OF THE RELATED ART

COVID-19 has forced educational institutions to re-think in-person schooling and hastily adopt remote or distance learning. This has fueled a rapid rise of online proctoring as an alternative to in-person proctoring. A proctored in-person exam has an individual (proctor) overseeing an exam and monitoring the test-takers. A proctor significantly impacts an exam's validity and integrity with airtight invigilation. If a test-taker violates the code of conduct, a proctor can discontinue the test and report the matter to the institution conducting the assessment. In contrast to a proctored in-person exam, online proctoring is a digital form of assessment that enables test-takers to take exams from any location. As the COVID-19 pandemic continues to upend higher education, institutions are forced to increasingly rely on digital alternatives to in-person testing. Over three-quarters of all education institutions in US are using remote, online proctoring of exams. A webcam, computer screen, and custom proctoring software like a lockdown browser are typically used during online proctoring to allow test-takers to take exams at a place of their choosing.

Online proctoring ranges from human surveillance via webcams to artificial intelligence (AI) software that temporarily takes over a student's browser (and computer) to automatically detect numerous forms of cheating. Educational institutions are leveraging human surveillance via webcams by contracting outside proctors (hired by 3rd party proctoring services) to see test-takers on video, monitor computer screens of the test-takers, and record video and computer interactions for further analysis of cheating during and after the test-taking session. The use of proctoring apps (i.e. software products that use AI techniques to "watch" students as they take tests or complete schoolwork) by educational institutions has also skyrocketed. These apps purport to determine whether a student is cheating. Recorded patterns of keystrokes and facial recognition technology are used to confirm whether the test-taker signing up for a test is the one taking it. Some apps use gaze-monitoring or eye-tracking [1] that is meant to ensure that students don't look off-screen too long, where they might have answers written down. Almost all apps use microphones and cameras to record students' surroundings, and they broadcast such data to a proctor or software tools, who then ensure that no one else is in the room.

Even if remote human surveillance or proctoring apps are successful at rooting out all cheating (which is unlikely), these methods amount to compelled mass biometric surveillance of potentially millions of test-takers. The COVID-19 pandemic has forced higher education institutions to deploy remote proctoring in a haste. These institutions are spending money to acquire products they do not fully understand, especially about whether these products balance the benefits of online proctoring with potential identity-theft or violation of privacy of the test-taker.

Test-takers have several serious concerns about online proctoring. First, test-takers perceive live proctoring as an invasion of their privacy [18] as they are taking exams in their home or work areas. In addition to the invasive gathering of biometric data, proctoring services gather and retain personally identifiable information (PII) [2] on test-takers—sometimes through their schools, or by requiring test-takers to input this data in order to register for an account [3]. This can include full name, date of birth, address, phone number, scans of government-issued identity documents, educational institution affiliation, and student ID numbers. Proctoring companies also automatically gather data on test-taker's devices, regardless of whether they are school-issued devices or not. These collected logs can include records of operating systems, make and model of the device, as well as device identification numbers, IP addresses, browser type and language settings, software on the device and their versions, records of URLs visited, and how long test-takers remain on a particular site or webpage. Much of this technology is indistinguishable from spyware [3], which is malware that is commonly used to track unsuspecting users' actions on their devices and across the Internet.

Second, many online proctoring systems also ask test-takers to scan their environment for unauthorized materials before they take a test (typically by circling the room with a laptop to the satisfaction of the remote proctor); and many test-takers feel shame or discomfort about showing their living conditions to a complete stranger. In the COVID-19 era, tests may also be interrupted by children, siblings, parents or other family members, leading to a violation of privacy of persons who are not test-takers.

Third, leveraging test-taker's data for commercial purposes is a big concern. Educational institutions and proctoring apps retain much of what they gather, with no time limits on retention. Some of this information is also sold or shared with third parties, and test-takers are often left without a clear way to request that their data be deleted because they aren't considered as the owner of the data.

Finally, gathering vast amounts of data on test-takers is also unwise given frequent breaches and subsequent inappropriate public disclosure. Recently [4], over 440,000 test-taker records from a commercial proctoring service were leaked on a hacker forum (including "email addresses, full names, addresses, phone numbers, hashed passwords, the affiliated organization, and other information"), leading to possibility of identity-theft.

Although there are many companies that provide online proctoring services or software, their focus is on improving the accuracy of detecting cheating behavior, and none of them consider preserving the privacy of the test-taker. For example, companies like ProctorU [5] and Examity [6] detect cheating through remote oversight by live proctors who watch test-takers via Skype and webcams. Proctorio [8] uses artificial intelligence (AI) techniques to monitor and flag body language and background noise that might point to cheating (instead of using human proctors). AI proctoring services like Honorlock [7] and Proctorio [8] also record video of test-takers and then use AI to analyze the data and recognize behavior that looks like cheating. They do this with facial recognition, detection, and eye tracking. They may also recognize noises that happen in the room and count that as cheating behavior, or cheating behavior can include leaving the camera view for a few seconds. However, none of these commercial products address the privacy concerns of test-takers during or after online proctoring.

Although many recent US patents have been issued related to online proctoring, none of these patents consider preserving the privacy of test-takers during online proctoring [9, 10, 11, 12, 13, 14, 15, 16].

There is really no way today to enforce how test-taker's private data is used during online proctoring, or in the future. It is highly desirable that a test-taker is not forced to make the choice to either hand over their biometric data and be surveilled continuously or to fail their class [3].

Accordingly, our invention applies to online proctoring, and it overcomes the shortcomings of prior art by safeguarding the privacy of the test-takers during and after online proctoring. Unlike prior art, our proposed invention discloses a radically new method that ensures privacy of the test-taker, while enabling online proctoring to detect various forms of cheating.

SUMMARY OF THE INVENTION

As our invention, we propose a radically new method of online proctoring that detects various forms of cheating, while safeguarding the privacy of the test-takers. In our method, proctors are either humans or AI-enabled software products, or a combination of the two.

Privacy-preserving online proctoring method, as proposed in our invention, has several advantages. First, unlike prior methods that focus on detecting various forms of cheating through a series of privacy-invasive monitoring techniques, our invention ensures the privacy of the test-taker and the test-taker's proctoring data and prevents misuse of proctoring data by third parties. Second, unlike prior proctoring methods that do not disclose the identity of entities that handle the proctoring data, the proposed method uses cryptographic keys so that the test-taker is aware of, and consents to every entity that handles the proctoring data by explicitly authorizing any entity that intends to process a proctoring data fragment. Third, unlike prior proctoring methods, no proctor has access to all the proctoring data since our invention chops the proctoring data into fragments, alters the fragments to anonymize personally identifiable information, and scrambles the order of the fragments so that no proctor can re-create the entire sequence of the proctoring data. Such selective altering and authorized sharing of proctoring data prevents violation of privacy and identify theft by the proctors, proctoring apps or a third-party affiliate of the proctor, while enabling effective detection of different forms of cheating. Finally, unlike prior proctoring methods that assume indefinite ownership of the proctoring data, the proposed invention allows the test-taker to control the retention period of the proctoring data, viewing of the proctoring data by authorized entities (through the use of a secure, custom viewer for the encrypted proctoring data fragment), and selective sharing of the proctored data with authorized entities. This prevents commercial use of the proctoring data, or the use of the proctoring data by a third party, or data breach due to compromise of proctoring service or proctoring app databases.

We envision the use of our invention by educational institutions, testing centers and many online proctoring companies. With the huge growth of online education—the industry is expected to grow from being a $4 billion market in 2019 to a nearly $21 billion market in 2023—the demand for online proctoring has sky-rocketed. The online exam proctoring market is expected to reach US $1.2 Billion by 2027 [17].

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein:

FIG. 1 shows the overall block diagram of the proposed system to do online proctoring while preserving the privacy of the test-taker.

FIG. 2 shows the preferred embodiment of a privacy-preserving mediator that acts on behalf of the test-taker to ensure privacy while enabling an effective online proctoring process to occur using remote proctors and arbiters.

FIG. 3 shows the preferred embodiment of a privacy-aware proctor that leverages several sub-proctors to proctor the test-taker in real-time while the online testing is ongoing.

FIG. 4 shows the preferred embodiment of a privacy-aware sub-proctor that performs the proctoring task on a fragment of the test-taking environment data, and flags suspicious activity for further review.

FIG. 5 shows the preferred embodiment of a privacy-aware arbiter that works with the test-taker to review suspicious fragments flagged by the sub-proctor in order to arrive at final verdict on the integrity of the test-taker during the online testing process.

DETAILED DESCRIPTION OF THE INVENTION

Overview of proposed privacy-preserving online testing method: FIG. 1 shows an overview of the proposed privacy-preserving online testing process. The test environment 100 includes the test-taker, computer and browser of the test-taker, a webcam, and a microphone. The test-taker uses a lockdown browser, which is a custom browser that locks down the testing environment within a learning management system. Such browsers are used routinely for securing online exams in classrooms or proctored environments. In a lockdown browser, assessments are displayed full-screen and they cannot be minimized. Also, browser menu and toolbar options are removed, except for a few navigational buttons. This prevents access to other applications including messaging, screen-sharing, virtual machines, remote desktop. Furthermore, printing and screen capture functions are also disabled, and copying and pasting anything to or from an assessment is prevented. Assignments administered using a lockdown browser cannot be exited until the student submits the assignment for grading. In addition to using a lockdown browser, the test environment also includes one or more webcams and microphones to observe the test-takers (and their environment) for unusual audiovisual activity. A privacy-preserving mediator 110 prepares the test data for the proctoring process by taking a series of steps to preserve the privacy of the test-taker, while ensuring that adequate proctoring of the test-taker occurs. The privacy-preserving mediator uses cryptographic keys, anonymizing techniques to remove personally identifiable information (PII), and scrambling techniques to safeguard the privacy of the test-taker. A privacy-aware proctor 120 manages the proctoring process without disclosing private information of the test-taker. Several sub-proctors 130 assist in the proctoring task by inspecting the data from lockdown browser, webcams and microphones to discover suspicious or unusual activity. Finally, the suspicious data is reviewed by a privacy-aware arbiter 150 to render the final verdict on the integrity of the test-taker.

Privacy-preserving mediator: FIG. 2 shows the proposed privacy-preserving mediator 200, which is the root of trust for preserving privacy of the test-taker. Also, the mediator ensures that the test-taker is fully aware of the different entities that have access to the test environment data (from webcams, microphones or lockdown browsers), and the specific data that was made available to the different entities. This ensures that the test-taker is actively involved, and consenting, to various proctoring tasks. The mediator chops up the data from webcams, microphones and lockdown browsers into equal or variable-sized fragments. Also, fragments can overlap. Such redundancy ensures that potential cheating at the fragment boundaries is captured in at least one fragment. Then, a series of AI and machine learning techniques are employed to alter personally identifiable information like the face of the test-taker, or the routine background of the test-taker using computer vision techniques [19,20]. Such altering preserves the privacy of the test-taker, while not affecting the efficacy of proctoring [21]. However, any unusual activity (like another person entering the field of view of the camera, or objects being moved into or out of the field of view, etc.) is retained in the video data. Subsequently, the fragments of test-environment data are scrambled so that the proctor or the sub-proctors do not know the sequence of the fragments to restore the original test data. Finally, each fragment is encrypted with a distinct cryptographic key, which is shared in a subsequent step with the sub-proctor who is analyzing the fragment. The mediator also performs two important functions: it generates and manages the keys required to authenticate and authorize the sub-proctors to inspect a data fragment, and it distributes a secure and custom viewer for inspecting the contents of the fragment. This viewer is the only way to view the encrypted video in the fragment or hear the encrypted audio in the fragment, and the test-taker can control how many times the fragment can be viewed or heard by the sub-proctor. By using cryptographic keys for authorization, the mediator is fully aware of the different entities that have access to the test-taker's personally identifiable information, and how many times these entities have reviewed the test-taker's private proctoring data.

Personally identifiable information: Department of Homeland Security [2] defines personally identifiable information or PII as any information that permits the identity of an individual to be directly or indirectly inferred, including any information that is linked or linkable to that individual, regardless of whether the individual is a U.S. citizen, lawful permanent resident, visitor to the U.S., or employee or contractor to the Department. Examples of PII include face images or video, social security numbers and telephone numbers, among others.

Privacy-aware proctor: FIG. 3 shows the proposed privacy-aware proctor 300. The proctor communicates with the mediator to obtain the authorization key (which is a cryptographic key used by the mediator to authenticate the proctor), and the secure viewer 310. Using the key, the proctor retrieves encrypted data fragments containing the test-taker's environment data 320, and distributes the proctoring work to several sub-proctors. The proctor randomly distributes the encrypted fragments to different sub-proctors. This ensures that the sub-proctors cannot re-create the original sequence of the test-taker's data. Furthermore, no sub-proctor has access to all the test-taker's proctoring data. This further prevents misuse of the private information of the test-taker by the anonymous sub-proctors. The proctor can be remote, and it can communicate with the mediator or the sub-proctors over a communication network.

The proctor also receives the proctoring results from the sub-proctors and flags suspicious fragments from the sub-proctors. The sequence numbers of the suspicious fragments are sent directly to the arbiter and the mediator. This ensures that the arbiter receives the sequence numbers of the suspicious encrypted fragments directly from the proctor, without any tampering by the mediator.

Privacy-aware sub-proctor: FIG. 4 shows the proposed privacy-aware sub-proctor 400. The sub-proctor communicates with the mediator to obtain the key 410 that is required to communicate with the proctor and receive the fragment to be proctored. Also, the sub-proctor obtains the viewer 420, which is necessary to view the data in the encrypted fragment. The sub-proctor can be a person or an analytics software that is trained to pick up unusual activity in the fragment 430. The sub-proctor is unaware of the personally identifiable information about the test-taker, and the test-taker is aware of and consents to the sub-proctor reviewing the proctoring data. The sub-proctor sends the proctoring results for the fragment to the proctor. In the proposed scheme, the sub-proctor is unaware of the other sub-proctors, and the sub-proctor reviews only a subset of the test-taker's proctoring data. Also, since the viewer will only permit the viewing of the test-data a limited number of times (as set by the test-taker), misuse of the test-taker's proctoring data for unauthorized purposes is avoided. If a sub-proctor needs more viewings of the data, then a test-taker can grant more views and still control who sees the data, and for what purpose.

Privacy-aware arbiter: FIG. 5 shows the proposed privacy-aware arbiter 500. The arbiter obtains the authorization key and viewer 510 from the mediator. This way, the mediator is aware of the arbiter and the data that will be accessed by the arbiter. After receiving the proctoring results from the proctor 550, the arbiter requests the mediator for the original fragments that correspond to the sequence numbers of the encrypted suspicious fragments 540. The mediator authenticates each request for original, encrypted fragment. Again, the secure, custom viewer is necessary to view the proctoring data. This ensures that the test-taker is aware of the use of original data by the arbiter, and the number of times the arbiter is permitted to review the data. If the arbiter requires more views of the fragments, then the test-taker can grant more views. It is in the interest of the test-taker to help the arbiter with the review process (so that the test-taker is cleared of any wrong-doing), but by limiting the views, the test-taker can prevent future, unauthorized use of the proctoring data by the arbiter. At all times, the test-taker is aware, and consents to all the entities that view the proctoring data. The verdict 530 is rendered by the arbiter (which can be a person, or an intelligent software agent) after a careful review of the suspicious fragments.

Having described preferred embodiments of a system and method for a privacy-preserving online proctoring method (which is intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for online proctoring of tests while preserving privacy of test-taker, comprising of the steps:
   a. capturing and recording proctoring data in chronological order, where proctoring data includes video and audio data from at least one camera and a microphone monitoring the test-taker and the test environment and data from a lockdown browser;
   b. chopping up said proctoring data into one or more proctoring data fragments,
   c. altering said proctoring data fragments to remove personally identifiable information;
   d. scrambling the chronological order of the said altered proctoring data fragments;
   e. distributing said scrambled, altered fragments to a pool of sub-proctors;
   f. reviewing altered proctoring data fragments for suspicious behavior, and marking suspicious fragments;
   g. comparing suspicious, altered fragments with original, unaltered versions of the fragments to confirm suspicious behavior, and render a verdict.

2. The method of claim 1, wherein proctoring data is chopped up into smaller, variable-length, and possibly overlapping proctoring data fragments, by using pseudo-random or deterministic methods.

3. The method of claim 1, wherein proctoring data fragments are altered to remove personally identifiable information.

4. The method of claim 3 where a test-taker's face in video data is blurred so that only the eyes, mouth and chin of the test-taker are visible.

5. The method of claim 1, wherein the true chronological order of the altered proctoring data fragments is scrambled by using pseudo-random or deterministic methods.

6. The method of claim 1, wherein independent proctors can be humans or AI software that can analyze proctoring data fragments for suspicious behavior.

7. The method of claim 1, wherein suspicious, altered proctoring data fragments are compared with unaltered versions either using humans or AI software to make final determination of suspicious behavior.

8. The method of claim 1, wherein proctoring data fragments are viewable only in a custom viewer, and test-taker can restrict the number of times the fragments can be viewed.

9. The method of claim 1, wherein test-taker uses cryptographic keys to be aware of and give consent to any entity that processes proctoring data fragment.

10. A system that performs online proctoring of tests while preserving privacy of test-taker, comprising:
    a. a camera and microphone to capture and record proctoring data in chronological order, where proctoring data includes video and audio data captured by cameras and microphones to monitor the test-taker and the test environment;
    b. a privacy-preserving mediator unit to chop up said proctoring data into one or more proctoring data fragments, alter said proctoring data fragments to remove personally identifiable information, scramble the chronological order of the said altered proctoring data fragments;
    c. a privacy-aware proctor unit to distribute said scrambled, altered proctored data fragments to a pool of sub-proctors;
    d. a privacy-aware sub-proctor unit that inspects a data fragment and determines suspicious behavior by test-taker;
    e. a privacy-aware arbiter unit that reviews altered proctoring data fragments for suspicious behavior, compares with original, unaltered fragments retrieved from said privacy-preserving mediator unit, and renders a verdict on integrity of test-taker.

11. The system of claim 10, wherein said privacy-preserving mediator unit chops up proctoring data into smaller, variable-length, and possibly overlapping proctoring data fragments by using pseudo-random or deterministic methods.

12. The system of claim 10, wherein proctoring data fragments are altered to remove personally identifiable information using computer vision or machine learning techniques.

13. The system of claim 12 where a test-taker's face in video data is blurred so that only the eyes, mouth and chin of the test-taker are visible.

14. The system of claim 10, wherein the true chronological order of original or altered proctoring data fragments is scrambled by using pseudo-random or deterministic methods.

15. The system of claim 10, wherein independent proctors can be software that can independently analyze proctoring data fragments for suspicious behavior, or the software can assist humans to review the said data fragments.

16. The system of claim 10, wherein suspicious, altered proctoring data fragments are compared with unaltered versions either using humans or AI software to make final determination of suspicious behavior.

17. The system of claim 10, wherein proctoring data fragments are viewable only in a custom viewer, and the said privacy-preserving mediator can restrict the number of times the fragments can be viewed.

18. The system of claim 10, wherein said privacy-preserving mediator uses cryptographic keys to be aware of and give consent to any entity that processes proctoring data fragment.

19. A computer program product including a non-transitory computer readable medium with instructions, said instructions enabling a computer to perform online proctoring while preserving privacy of test-taker, said instructions comprising:
    a. instructions for a camera and microphone to capture and record proctoring data in chronological order, where proctoring data includes video and audio data captured by cameras and microphones to monitor the test-taker and the test environment;
    b. instructions for a privacy-preserving mediator unit to chop up said proctoring data into one or more proctoring data fragments, alter said proctoring data fragments to remove personally identifiable information, scramble the chronological order of the said altered proctoring data fragments;
    c. instructions for a privacy-aware proctor unit to distribute said scrambled, altered proctored data fragments to a pool of sub-proctors;
    d. instructions for a privacy-aware sub-proctor unit that inspects a data fragment and determines suspicious behavior by test-taker;
    e. instructions for a privacy-aware arbiter unit that reviews altered proctoring data fragments for suspicious behavior, compares with original, unaltered fragments retrieved from said privacy-preserving mediator unit, and renders a verdict on integrity of test-taker.

* * * * *